United States Patent [19]

Kimblin et al.

[11] 4,319,296

[45] Mar. 9, 1982

[54] SERIES CONNECTED OSCILLATING TRANSVERSE FIELD INTERRUPTER AND METHOD

[75] Inventors: Clive W. Kimblin, Pittsburgh; Francis A. Holmes, Monroeville; Joachim V. R. Heberlein, Pittsburgh; Joseph G. Gorman, Murrysville; Paul G. Slade, Pittsburgh, all of Pa.

[73] Assignee: Electric Power Research Institute, Inc., Palo Alto, Calif.

[21] Appl. No.: 65,928

[22] Filed: Aug. 13, 1979

[51] Int. Cl.$^3$ .................... H02H 3/00

[52] U.S. Cl. .................... 361/4; 200/144 B

[58] Field of Search .................... 361/4, 3, 10, 12, 14; 200/144 B, 145

[56] References Cited

U.S. PATENT DOCUMENTS

| | | | |
|---|---|---|---|
| 1,906,602 | 5/1933 | Hull | 361/120 |
| 3,147,356 | 9/1964 | Luehring | 200/144 B |
| 4,021,628 | 5/1977 | Kimblin | 200/144 B |
| 4,172,268 | 10/1979 | Yanabu et al. | 361/4 |
| 4,216,513 | 8/1980 | Tokuyama et al. | 361/4 X |
| 4,250,364 | 2/1981 | Kimblin et al. | 200/144 B |

*Primary Examiner*—Reinhard J. Eisenzopf

*Attorney, Agent, or Firm*—Flehr, Hohbach, Test, Albritton & Herbert

[57] ABSTRACT

The invention provides a technique for interrupting current employing a plurality of series connected vacuum arcs in parallel with a resonating circuit. At least one of the series vacuum arcs is subjected to an oscillating transverse magnetic field which produces modulations in the arc voltage. The arc voltage modulations initiate oscillations in the parallel resonating circuit, producing current modulations in the series connected vacuum arcs. The current modulations rapidly extinguish the arcs, interrupting the current. Use of a plurality of series connected vacuum arcs improves the recovery voltage hold-off potential of the circuit.

17 Claims, 4 Drawing Figures

SERIES CONNECTED OSCILLATING TRANSVERSE FIELD INTERRUPTER AND METHOD

The invention relates generally to current interruption circuits employing vacuum arc devices for use in controlling large currents associated with power transmission and distribution lines.

There exists a continuing need in the electric power industry for improved current limiting and interrupting devices. One well-known device for interrupting relatively large currents is the vacuum arc current interrupter. Typically, vacuum arc interrupters employ separable electrodes sealed in a vacuum bottle. The electrodes are separated to interrupt current flow, with an arc arising between the electrodes after separation. In an alternating current (AC) system, the arc will disappear at a normal current zero in the AC cycle. If sufficient dielectric strength exists in the gap between the electrodes, the arc will not reappear and current interruption will be complete. A problem with interrupting large current using a conventional vacuum arc interrupter is the enormous voltage transients which build up after arc extinction, resulting in arc reignition. In addition, conventional vacuum arc interrupters must await a current zero before interrupting current flow, and the delay can permit enormous fault currents to develop which can seriously damage equipment.

One improved type of current interrupter capable of rapid arc extinction in less than a single current half-cycle of an alternating current system is disclosed in U.S. Pat. No. 4,250,364 issued Feb. 10, 1981, assigned to the assignee of the present application. In the interrupter disclosed in U.S. Pat. No. 4,250,364 issued Feb. 10, 1981 the vacuum arc is subjected to a strong oscillating transverse magnetic field which periodically reverses polarity causing oscillations in the arc current through a parallel resonant circuit. The interrupter disclosed in U.S. Pat. No. 4,250,364 issued Feb. 10, 1981 has been found to rapidly interrupt very large currents by producing large modulations in the arc current which rapidly drive the arc current to zero. It has been discovered, however, that the power dissipated within the interrupter is relatively large, and in some instances overheating of the electrodes results. This is believed to be caused by the large arc voltage which is developed while the current flow remains high. The problem presented by overheating is that it tends to reduce the ability of the interrupter to handle large recovery voltages which may occur.

It is an object of the present invention to provide a method and means of current interruption in which the recovery voltage hold-off potential of a circuit which employs an oscillating transverse magnetic field interrupter is increased.

Another object of the invention is to provide a current interruption device capable of rapidly interrupting large current without arc reignition.

Another object of the invention is to provide a method of interrupting current which employs a plurality of series connected vacuum arc gaps with an oscillating transverse magnetic field provided in at least one of the arc gaps.

Accordingly, a current interruption means is provided which includes a first circuit having a plurality of vacuum arc interrupters connected in series. At least one of the series vacuum arc interrupters includes oscillating field coil means for subjecting an arc in at least one vacuum arc interrupter to an oscillating transverse magnetic field, modulating the arc voltage thereof. A second circuit is connected in parallel with the first circuit. The second circuit includes resonant circuit means for producing resonating current fluctuations. The voltage modulations in the first circuit cause the resonant circuit means to produce resonating current fluctuations in the first and second circuits which lead to rapid simultaneous arc extinction in the series vacuum arc interrupters.

The method of interrupting current according to the present invention comprises the following steps: The current is passed through a plurality of series connected vacuum gaps in a first circuit. Oscillating lines of magnetic force are produced transverse to the direction of current flow in at least one of the arc gaps. The oscillating lines of magnetic force produce a responsive modulation of the arc voltage in at least one arc gap in which the oscillating lines of magnetic force are produced. Current in the first circuit is modulated by providing a second circuit in paraell with the first circuit. The second circuit includes resonant circuit means which produce resonating current fluctuations in both the first and second circuits primarily in response to the voltage modulation in the vacuum gap in which the oscillating lines of magnetic force are produced. The current fluctuations in the first circuit drive the current to zero and simultaneously extinguish all series arcs in the first circuit.

A preferred embodiment of the invention is described in detail below with reference being made to the accompanying drawings, in which.

Figure 1:
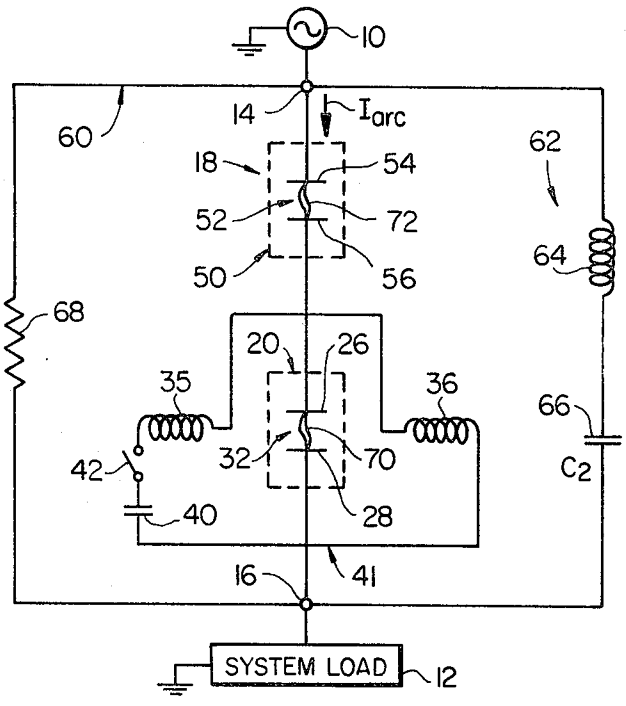
FIG. 1 is a schematic circuit diagram illustrating a current interruption device according to the present invention.

FIG. 1 shows a current interruption means according to the present invention connected in an alternating current system having a power supply 10 and a load 12. Both the power supply and load are representations of a power transmission and distribution system of the type which operates at a predetermined signal frequency, such as 60 Hz. The current interruption means of the present invention is installed on a power transmission or distribution line between points 14 and 16.

The current interruption device includes a first circuit 18 having a plurality of vacuum arc interrupters connected in series. Two series-connected interrupters are used in the illustrated embodiment. A first interrupter 20 is of the type which includes oscillating field coil means for subjecting an arc therein to an oscillating transverse magnetic field for the purpose of modulating the arc voltage across the device. Interrupter 20 is constructed in accordance with the teaching of application Ser. No. 951,070, filed Oct. 13, 1978, and is referred to in the present application as an oscillating transverse magnetic field interrupter, or by a similar designation.

Figure 2:
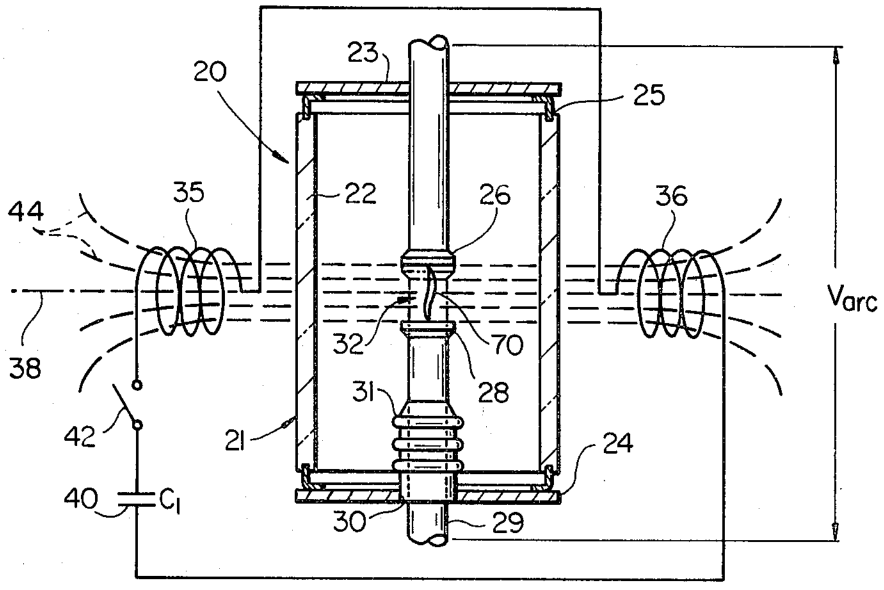
FIG. 2 is a cross sectional view of an oscillating transverse field interrupter of the type used in the present invention.

Interrupter 20 and the associated oscillating field coils are shown in greater detail in FIG. 2.

Interrupter 20 includes an evacuated enclosure 21 having a cylindrical side wall 22 formed of glass or a suitable ceramic material. A pair of metal end caps 23 and 24 are sealed to the cylindrical side wall 23 by suitable seals 25. A pair of electrode members 26 and 28 are supported for relative movement within enclosure 21. In the preferred embodiment, electrode 28 is movable, with the stem 29 extending through an opening 30 in end plate 24, and is sealed to the enclosure by a suitable metal bellows 31 in the well-known manner. The electrodes are movable between a closed position, shown in phantom in FIG. 2, in which the electrodes are in mutual contact, and open position, shown with solid line in FIG. 2. When open, the electrodes define a vacuum arc gap 32 between the contact surfaces. The interior of envelope 21 is evacuated to a pressure of approximately $10^{-4}$ torr or less.

The oscillating field coil means associated with vacuum arc interrupter 20 includes coil means for producing lines of magnetic force in arc gap 32 transverse to the arcing path. The arcing path extends generally perpendicularly between the contact faces of electrodes 26 and 28. The coil structure includes a pair of coils 35 and 36 disposed along a transverse axis 38 substantially perpendicular to the arcing path across arc gap 32. Coils 35 and 36 are connected to a power supply in the form of a capacitive charge storage circuit which includes one or more unpolarized capacitors 40 ($C_1$) and a switch 42. Coils 35 and 36 together with the capacitive charge storage circuit form a first resonating circuit 41 having a first characteristic resonant frequency. Circuit 41 produces lines of magnetic force 44 in arc gap 32, and because the circuit resonates, the lines of magnetic force will oscillate and periodically reverse polarity in the manner described in application Ser. No. 951,070.

First circuit 18 additionally includes a series connected vacuum arc interrupter 50 which is without any oscillating field coil means. In other words, interrupter 50 is a conventional vacuum-type current interrupter. The vacuum arc gap 52 in interrupter 50 is installed in series with gap 32 of interrupter 20. The essential interior features of interrupter 50 are similar to those in enclosure 21 of interrupter 20, and include a pair of separable electrodes 54 and 56 which define the vacuum arc gap 52.

Both vacuum arc interrupters 20 and 50 are coupled to suitable actuating means (not shown) for rapidly separating their respective electrodes. Depending on the physical proximity of the interrupters, it might be feasible to have both interrupters coupled to a single actuator. Otherwise, separate actuators can be used. The actuating means should be capable of rapidly separating the electrodes in interrupters 20 and 50 to produce arc gaps of several centimeters in width within several milliseconds. For the series arc gaps to be effective, the electrodes in both interrupters should separate substantially simultaneously. Either a single actuator mechanically connected to both interrupters or separate actuators which are simultaneously energized would be suitable for this purpose.

A second circuit 60 is connected in parallel with first circuit 18 between points 14 and 16. The second circuit 60 includes resonant circuit means for producing resonating current fluctuations. In the illustrated embodiment, the resonant circuit means includes an impedance circuit 62 having inductive and capacitive circuit elements, 64 and 66, respectively, in parallel with a resistive circuit element 68. Resistor 68 is a current limiting impedance into which the power line current can be diverted when the current path through first circuit 18 has been eliminated. The inductive element 64 in impedance circuit 62 may be in the form of a residual impedance associated with connecting leads or the like. Capacitor 66 ($C_2$) is preferably a discrete circuit element. Second circuit 60 is a resonating circuit which has a second characteristic resonant frequency. In accordance with the teaching of application Ser. No. 951,070, the second characteristic resonant frequency of second circuit 60 should be at least as great as twice the first characteristic resonant frequency of field coil circuit 41. Moreover, the first characteristic resonant frequency of field coil circuit 41 should be substantially higher than the signal frequency of the AC system (e.g., 60 Hz) to allow for rapid arc extinction with a single current half-cycle.

In operation, the current interruption means described above is connected in a power system in the manner depicted in FIG. 1. With the electrodes in interrupters 20 and 50 closed, current flows freely through first circuit 18 between points 14 and 16, preventing any current from passing through second circuit 60 with its resonant circuit elements. Whenever circuit isolation is called for, such as when a fault condition produces an enormous current surge, a signal is sent to the previously-described actuating means (not shown) which simultaneously separates electrodes 26 and 28 to form arc gap 32 and electrodes 54 and 56 to form arc gap 52. Immediately upon separation of the electrodes, arc 70 and 72 appear in arc gaps 32 and 52, respectively. The series connected vacuum arcs will continue to carry substantially the full current until extinguished.

Figure 3:
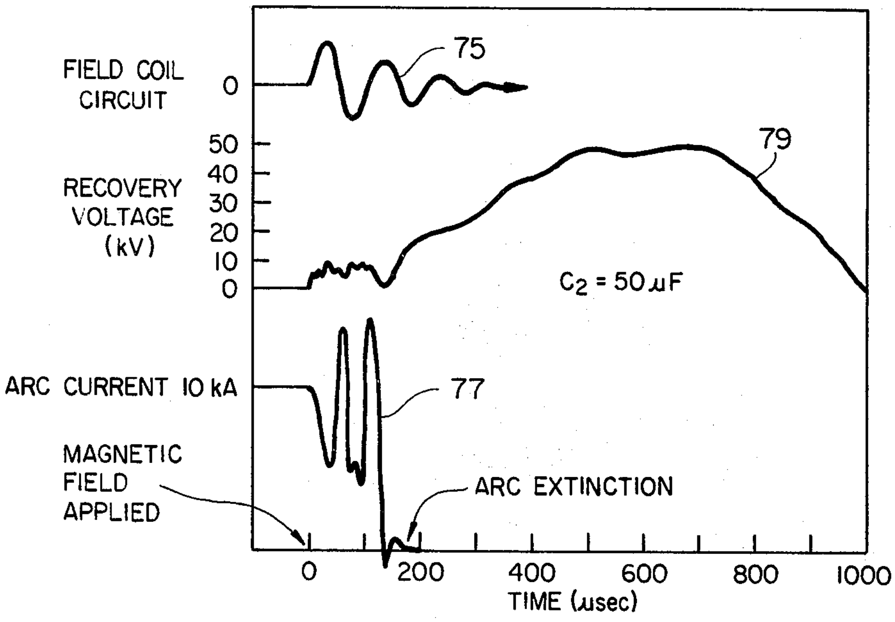
FIG. 3 is a graphic representation of several parameters which illustrate the performance of the present invention.

Following electrode separation, the current to be interrupted is initially carried in first circuit 18 through the series connected vacuum arc gaps 32 and 52. To extinguish the arcs and thereby interrupt the current, the remaining steps in the method of the present invention are carried out. First, switch 42 in resonating field coil circuit 41 is closed. The closing of switch 42 causes capacitor 40, which will have been previously charged, to discharge through field coils 35 and 36. The field coils produce oscillating lines of magnetic force 44 transverse to the direction of current flow in arc gap 32. What is meant by the direction of current flow across arc gap 32 is the principal arcing path of arc 70 between the contact faces of electrodes 26 and 28. The lines of magnetic force 44 will oscillate and periodically reverse polarity at a first resonant frequency rate which is the first characteristic resonant frequency of field coil circuit 41. Trace 75 in FIG. 3, representing a damped sinusoidal curve, approximates the variations in the magnetic field produced in arc gap 32 by field coil circuit 41 following closure of switch 42.

The oscillating lines of magnetic force in arc gap 32 cause a responsive modulation of the arc voltage of interrupter 20 ($V_{arc}$ in FIG. 2), in accordance with the teaching of application Ser. No. B 951,070. Voltage modulations across interrupter 20 will result in resonating current fluctuations in both first circuit 18 and parallel resonating circuit 60. The current fluctuations occur when second circuit 60, connected in parallel with the series vacuum arc gaps, begins to oscillate at a second resonant frequency, which is the second characteristic resonant frequency of parallel circuit 60. Resonating current fluctuations are produced in both the first and second parallel circuits by the oscillations in circuit 60. The result is a significant modulation of the arc current ($I_{arc}$ in FIG. 1), as indicated by trace 77 in FIG. 3. In accordance with the teachings of application Ser. No. 951,070, the current oscillations will rapidly drive the arc current to zero. Simultaneous arc extinction then occurs in all the series arcs in first circuit 18. Assuming that the first resonant frequency at which the lines of magnetic force oscillate is substantially higher than the AC signal frequency of the power system, arc extinction will occur in a fraction of a single system half-cycle.

Once the series arcs have been extinguished in the vacuum arc devices, it is important that arc reignition be prevented during the build-up of recovery voltage which occurs following current interruption. The size of the recovery voltage in a typical interruption operation is shown by trace 79 in FIG. 3. In the example illustrated in FIG. 3, the current interrupted was 10 kA, and the value of capacitor 66 ($C_2$) in the parallel circuit 60 was 50 microfarads. Note that following arc extinction the recovery voltage approached 50 kV.

Figure 4:
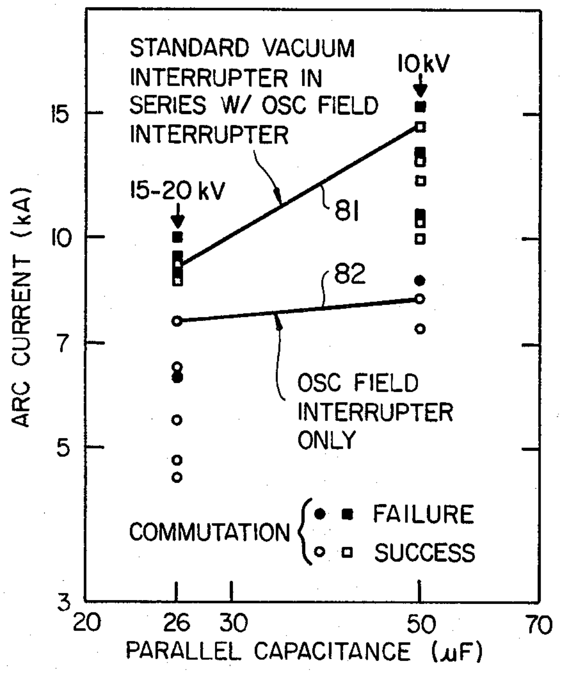
FIG. 4 is a graphic representation of the performance of an interrupter according to the present invention as compared with an oscillating transverse field interrupter alone.

The use of more than one vacuum arc gap in series in the first circuit 18 is particularly advantageous in handling large recovery voltages. Although the oscillating transverse field device 20 is capable alone of driving the arc current to zero, as demonstrated in application Ser. No. 951,070, it has been found that adding a vacuum arc gap in series improves the recovery voltage hold-off potential. FIG. 4 illustrates the improvement in current interruption performance which as been found to occur when a standard vacuum interrupter is connected in series with an oscillating transverse field interrupter. Trace 81 shows values of arc current successfully commutated in an interrupter circuit as shown in FIG. 1. Trace 82 shows the performance of a similar circuit which includes an oscillating transverse field interrupter such as interrupter 20, but without any other series-connected vacuum arc gaps.

The improvement in performance resulting from the addition of a vacuum arc gap in series with the oscillating field-type interrupter, particularly with respect to handling large recovery voltages, is believed to result from the smaller energy dissipated in the series-connected device. It is known that the energy dissipated in an oscillating transverse field device is relatively large, due to the high arc voltages developed during periods of high current flow. The result is a substantial amount of heating of the electrodes. A conventional device, on the other hand, develops a relatively low arc voltage as compared with an oscillating transverse field device. When a conventional vacuum arc interrupter is connected in series with the oscillating transverse field device, the arc voltage is developed primarily across the oscillating transverse field device, which also sustains most of the energy dissipation. The conventional device remains relatively cool and is thus able to withstand large recovery voltages following arc extinction, whereas the oscillating transverse device might reignite if it had to hold off the recovery voltage alone.

The embodiment of the invention described herein includes a conventional vacuum arc interrupter in series with an oscillating transverse field interrupter, but it should be understood that a plurality of vacuum arc interrupters of each type could be used in first circuit 18 to carry out the present invention. Alternatively, two or more oscillating transverse field devices could be connected in series to form first circuit 18. If more than one oscillating transverse field device is used, however, means would have to be provided for synchronizing the field oscillations in the various interrupters. It would also be possible to use more than one conventional vacuum arc interrupter, without oscillating transverse fields, in series with an oscillating transverse field device. In any alternative circuit employing the present invention, at least one of the series vacuum arc gaps will be provided with means for producing oscillating lines of magnetic force transverse to the arcing path. As in any circuit where series-connected vacuum arc gaps are employed, it may prove necessary to include conventional voltage grading circuit element to distribute the overall voltage across the various devices. Such a voltage grading circuit might include a plurality of series-connected capacitors, each additionally connected in parallel with an associated vacuum arc gap. Other changes or modifications within the scope of the present invention will occur to those skilled in the art.

The invention provides a method and means of employing an oscillating transverse magnetic field interrupter to interrupt large currents, and increases the recovery voltage hold-off potential of the circuit. The invention also provides a current interruption device capable of rapidly interrupting large currents without arc reignition. A method of interrupting current has been provided which employs a plurality of series-connected vacuum arc gaps together with an oscillating transverse magnetic field in at least one of the arc gaps.

What is claimed is:

1. Current interruption means comprising:

a first circuit which includes a plurality of vacuum arc interrupters connected in series, at least one of said series vacuum arc interrupters including oscillating field coil means for subjecting an arc in said at least one vacuum arc interrupter to an oscillating transverse magnetic field to modulate the arc voltage thereof, and a second circuit connected in parallel with said first circuit including all of said series connected interrupters, said second circuit including resonant circuit means for producing resonating current fluctuations, wherein voltage modulations in said first circuit cause said resonant circuit means to produce resonating current fluctuations in said first and second circuits which lead to rapid simultaneous arc extinction in said series vacuum arc interrupters.

2. Current interruption means as in claim 1 in which said at least one series vacuum arc interrupter which has said oscillating field coil means includes a pair of electrodes disposed in a vacuum enclosure, said electrodes defining an arc gap across which an arcing path extends between said electrodes, said oscillating field coil means including coil means for producing lines of magnetic force in said arc gap transverse to said arcing path, and a capacitive charge storage circuit for energizing said coil means, said coil means together with said capacitive charge storage circuit forming a resonating circuit have a first characteristic resonant frequency which causes periodic reversals of polarity in said lines of magnetic force.

3. Current interruption means as in claim 2 in which said resonant circuit means in said second circuit has a second characteristic resonant frequency which is at least as great as twice said first characteristic resonant frequency of said oscillating field coil means.

4. Current interruption means as in claim 3 in which said current interruption means is employed to rapidly interrupt an alternating current having a predetermined signal frequency, said first characteristic resonant frequency of said oscillating field coil means being substantially higher than said signal frequency.

5. Current interruption means as in claim 1 in which said first parallel circuit has at least one of said vacuum arc interrupters which includes said oscillating field coil means and at least one said vacuum arc interrupter without said oscillating field coil means.

6. Current interruption means as in claim 1 in which said parallel second circuit includes a resistive circuit element in parallel with an impedance circuit having capacitance and inductance to form said resonant circuit means.

7. Current interruption means comprising:

first and second circuits connected in parallel, said first circuit including a plurality of series connected vacuum arc gaps, and oscillating field coil means for producing oscillating lines of magnetic force transverse to the direction of current flow in at least one of said arc gaps, said oscillating lines of magnetic force producing a responsive modulation of the arc voltage in at least one of said arc gaps, and said second circuit including resonant circuit means which produce resonating current fluctuations in both said first and second circuits in response to the voltage modulations in at least one of said arc gaps to modulate the current in said first circuit and drive the current to zero and simultaneously extinguish all series arcs in said arc gaps of said first circuit.

8. Current interruption means as in claim 7 in which said oscillating field coil means includes coil means for producing lines of magnetic force, and a capactive charge storage circuit for energizing said coil means, said coil means together with said capacitive charge storage circuit forming a resonating circuit having a first characteristic resonant frequency which causes periodic reversals of polarity in said lines of magnetic force.

9. Current interruption means as in claim 8 in which said resonant circuit means in said second circuit has a second characteristic resonant frequency which is at least as great as twice said first characteristic resonant frequency of said oscillating field coil means.

10. Current interruption means as in claim 9 in which said current interruption means is employed to rapidly interrupt an alternating current having a predetermined signal frequency, said first characteristic resonant frequency of said oscillating field coil means being substantially higher than said signal frequency.

11. Current interruption means as in claim 7 in which said first circuit includes at least one said series vacuum arc gap in which said oscillating field coil means produces said oscillating lines of magnetic force and at least one said series vacuum arc gap without said oscillating field coil means and without said oscillating lines of magnetic force therein.

12. A method of interrupting current comprising the steps of: passing the current through a plurality of series connected vacuum arc gaps in a first circuit, producing oscillating lines of magnetic force transverse to the direction of current flow in at least one of said arc gaps, said oscillating lines of magnetic force producing a responsive modulation of the arc voltage in at least one of said arc gaps, and modulating the current in said first circuit by providing a second circuit in parallel with said first circuit including all of said gaps, said second circuit including resonant circuit means which produces resonating current fluctuations in both said first and second circuits primarily in response to the voltage modulations in at least one of said vacuum arc gaps whereby said current modulation in said first circuit will drive the current to zero and simultaneously extinguish all series arcs in said first circuit.

13. A method as in claim 12 in which the oscillations of said oscillating lines of magnetic force are at a first resonant frequency and the resonating current fluctuations provided in both said first and second circuits by said resonant circuit means are a second resonant frequency which is at least as great as twice said first resonant frequency.

14. A method as in claim 12 including providing at least one vacuum arc gap in said first circuit without oscillating lines of magnetic force in series with said at least one vacuum arc gap in which said oscillating lines of magnetic force are provided.

15. A method as in claim 12 in which the oscillations in the lines of magnetic force produced in said step of producing oscillating lines of magnetic force includes periodic reversals in the polarity of said lines of magnetic force.

16. A vacuum arc current interruption device comprising:

at least two series connected vacuum arc interrupters, each of which includes an evacuated envelope, a pair of electrodes supported in said envelope for relative movement between a closed position in which said electrodes are in mutual contact and an open position in which said electrodes are separated to define an arc gap there-between, arcing in said arc gap occuring along an arcing path between said electrodes as said electrodes are moved from a closed position to an open position when said electrodes are separated, magnetic means for producing an oscillatory magnetic field in the arc gap of one of said interrupters transverse to its arcing path for producing an oscillatory arc voltage, and resonant circuit means connected in parallel with all of said interrupters and responsive to said oscillatory arc voltage to produce an oscillatory arc current whereby said arcs tend to be extinguished when said current approaches zero.

17. A method of vacuum arc extinction in a circuit in which a number of series connected vacuum arc interrupters are provided, each of which includes a vacuum arc extending along an arcing path in an arc gap between a pair of spaced electrodes disposed in an evacuated envelope, and in which a resonant field circuit having a first characteristic resonant frequency is associated with one of the interrupters of said circuit for producing lines of magnetic force, and including a resonant parallel circuit having capacitance and inductance connected in parallel with the arc gaps of all of said interrupters and having a second characteristic resonant frequency, said method comprising the steps of: causing said resonant field circuit to produce lines of magnetic force in the arc gap of said associated interrupters transverse to its arcing path and permitting said resonant field circuit to oscillate at said first characteristic resonant frequency whereby said lines of magnetic force are periodically reversed along with any arc voltage in said last-mentioned arc gap, and in response to said periodically reversing arc voltage simultaneously causing arc current carried by said resonant parallel circuit to oscillate at said second characteristic resonant frequency whereby said arcs tend to be extinguished when said current approaches zero.

* * * * *